May 28, 1968     T. BOHN ET AL     3,385,983
MAGNETOHYDRODYNAMIC ENERGY CONVERTER

Filed April 15, 1965     2 Sheets-Sheet 1

Thomas Bohn
Hans-Arno Claassen
Karl A. Stradal
*INVENTOR.*

BY

*Karl F. Ross*
*Attorney*

United States Patent Office 3,385,983
Patented May 28, 1968

---

3,385,983
MAGNETOHYDRODYNAMIC ENERGY CONVERTER
Thomas Bohn, Julich, Hans-Arno Claassen, Aachen, and Karl Alfred Stradal, Julich, Germany, assignors to Kernforschungsanlage Julich des Landes Nordrhein-Westfalen-e.V., a corporation of Germany
Filed Apr. 15, 1965, Ser. No. 448,305
Claims priority, application Germany, Apr. 16, 1964, K 52,699
7 Claims. (Cl. 310—11)

ABSTRACT OF THE DISCLOSURE

Magnetohydrodynamic energy converter wherein an ionized gas is passed through a helical channel within a magnetic field oriented in the direction of the channel axis, the channel being bounded by inner and outer conductive walls across which a load is connected to abstract electrical energy from charged particles of the gas stream.

---

Our present invention relates to a magnetohydrodynamic energy converter of the type wherein a hot ionized gas, such as a metal vapor, is conducted through a magnetic field which separates its oppositely charged particles so as to let them impinge upon a positive and a negative electrode, respectively, on opposite sides of the gas channel.

Such hot gases, e.g., mercury or cesium, undergo progressive ionization so that electrons and positive ions continue to separate as the gas moves through the magnetic field generally at right angles thereto. In order to maintain a reasonable efficiency, conventional systems of this type require rather lengthy channel structures and a correspondingly distributed source of magnetic flux. In a typical prior-art energy converter of this type, the maximum magnetic induction was around 2 Webers per m.$^2$ of flux area. On the other hand, these converters were of a rather bulky construction with an average weight of about 1 ton per liter of channel volume.

The general object of our present invention is to provide a compact and highly efficient energy converter of the character referred to.

In accordance with this invention, we provide means for guiding the hot ionized gas, such as a metal vapor heated to a temperature on the order of 3000° C., in a direction generally transverse to a magnetic field through a curved channel forming a plurality of turns, specifically a helicoidal or helical channel whose axis is substantially parallel to the direction of the magnetic flux. Advantageously, this channel has a generally rectangular cross-section defined by a pair of helical electrodes forming the lateral channel walls and successive turns of a helically convoluted dielectric strip defining the two remaining (i.e., transverse) walls of the channel, the two helical electrodes being located along two imaginary coaxial cylinder surfaces. Where the source of magnetic flux consists of one or more electromagnetic coils with a single axis, the latter advantageously coincides with the axis of the helical channel and of the two imaginary cylindrical surfaces whereon the inner and outer channel walls are located.

In a preferred embodiment, the electromagnetic coil or coils are wound of wire or other conductor elements maintained in a superconductive state by suitable cooling means known per se so that a magnetic field of the desired intensity can be generated with the aid of a very low energizing voltage.

If the magnetic field is constant and so oriented that the positively charged ions will strike the inner channel wall whereas electrons will impinge upon the outer wall, the intensity of the magnetic field may be so calculated in relation to the speed of the gas stream that the particles must attain a certain degree of ionization before being deflected into contact with the inner electrode. The latter could be formed as a layer on a helically grooved cylinder of dielectric material which also forms the transverse channel walls; the outer electrode may then be constituted by a helical zone on a continuous metallic sleeve surrounding the dielectric body. It is, however, also possible to shape each electrode as a narrow metallic strip or as a succession of such strips in conductive contact with one another, and to separate adjacent turns of the helically wound strips by a similarly wound insulating member constituting the transverse channel walls.

The electrodes should, of course, consist of a metal or alloy, e.g., tantalum, capable of withstanding the high temperatures contemplated; similarly, a dielectric (e.g., ceramic) material of suitable refractoriness will have to be used for the nonconductive channel members.

The invention will be described in greater detail with reference to the accompanying drawing in which.

Figure 1:
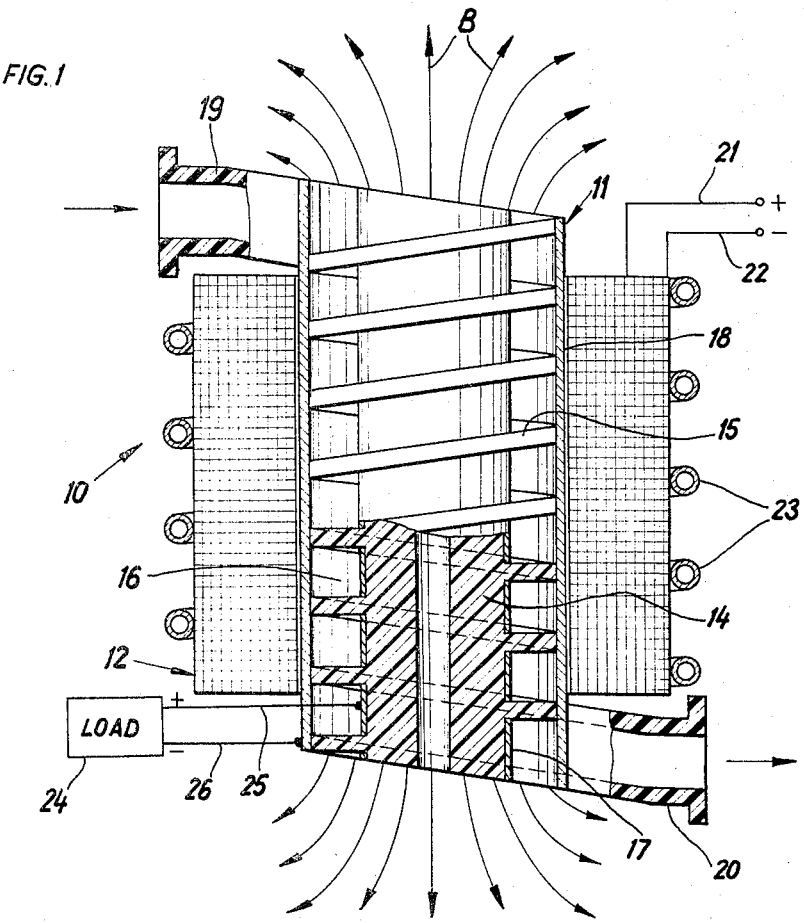
FIG. 1 is a sectional view of a magnetohydrodynamic converter embodying our invention.
Figure 2:
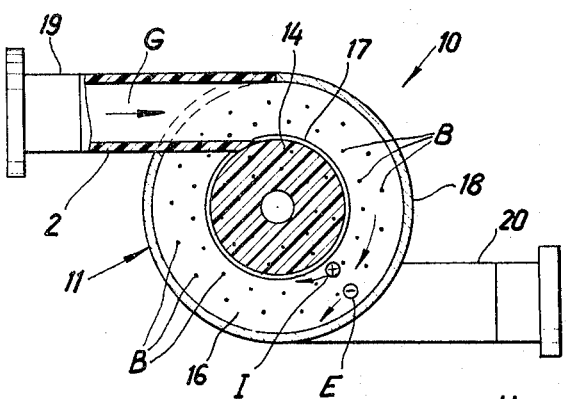
FIG. 2 is an axial view, partly in section, of the converter shown in FIG. 1 diagrammatically illustrating its mode of operation.

In FIGS. 1 and 2 we have shown a magnetohydrodynamic energy converter 10 having a channel structure 11 surrounded by an electromagnetic coil 12. Channel structure 11 comprises a generally tubular body 14 of insulating material which is formed integral with a helical outer rib 15 of rectangular profile defining opposite walls of a gas channel 16 of rectangular cross-section. The two remaining walls of channel 16 are formed by a conductive strip 17, wound helically along the outer surface of core 14 between adjacent turns of rib 15, and by a confronting helical zone of a metal cylinder 18 which closes the open spaces between these turns. Channel 16 communicates at opposite ends with an inlet tube 19 and an outlet tube 20 whose internal cross-section matches that of the channel and which open tangentially into the annular clearance between core 14 and cylinder 18.

Coil 12 is connected across an energizing circuit including a pair of conductors 21, 22 which lead to the positive and the negative terminal, respectively, of a direct-current source not further illustrated. In the preferred mode of realization, in which the coil 12 is maintained in a state of superconductivity, conductors 21 and 22 may be energized from a battery or other source of relatively low voltage. This superconductive state may be brought about, in a manner known per se, by cooling means illustrated diagrammatically as a conduit 23 wound around the coil 12 and adapted to carry a suitable cooling fluid, e.g. liquid helium, which is circulated therethrough by means not shown.

The inner metallic strip 17 and the outer metal cylinder 18 constitute respective electrodes shown connected across a load 24 by means of output leads 25 and 26. The current flow in output circuit 24–26 is generated by an ionized gas admitted at high temperature into the channel 16 by way of inlet 19 and discharged therefrom via outlet 20, the path of the gas along channel 16 being substantially perpendicular to the lines of flux of a constant magnetic field creating a flux B in axial direction of coil 12 and channel 16. As indicated in FIG. 2, the polarity of the flux B is so chosen that positive ions in channel 16 are deflected inwardly toward inner electrode 17 whereas negative electrons strike the outer electrode 18. The intensity of this flux, suitably controlled by the flow of a current of chosen magnitude through coil 12, and the velocity of the gas stream are advantageously such that gas particles in a lower state of ionization will experience a magnetic deflection substantially corresponding to the curvature of channel 16 whereas more highly charged positive ions will be deflected inwardly to strike the electrode strip 17. Uncharged particles, of course, are physically constrained to move within the confines of channel 16. The average axial velocity of the particles, on the other hand, is constant and independent of ionization over the full channel length. In this manner, thermal dissociation and magnetic separation of charges will take place over the entire channel length so that the system will operate with very high efficiency.

Figure 3:
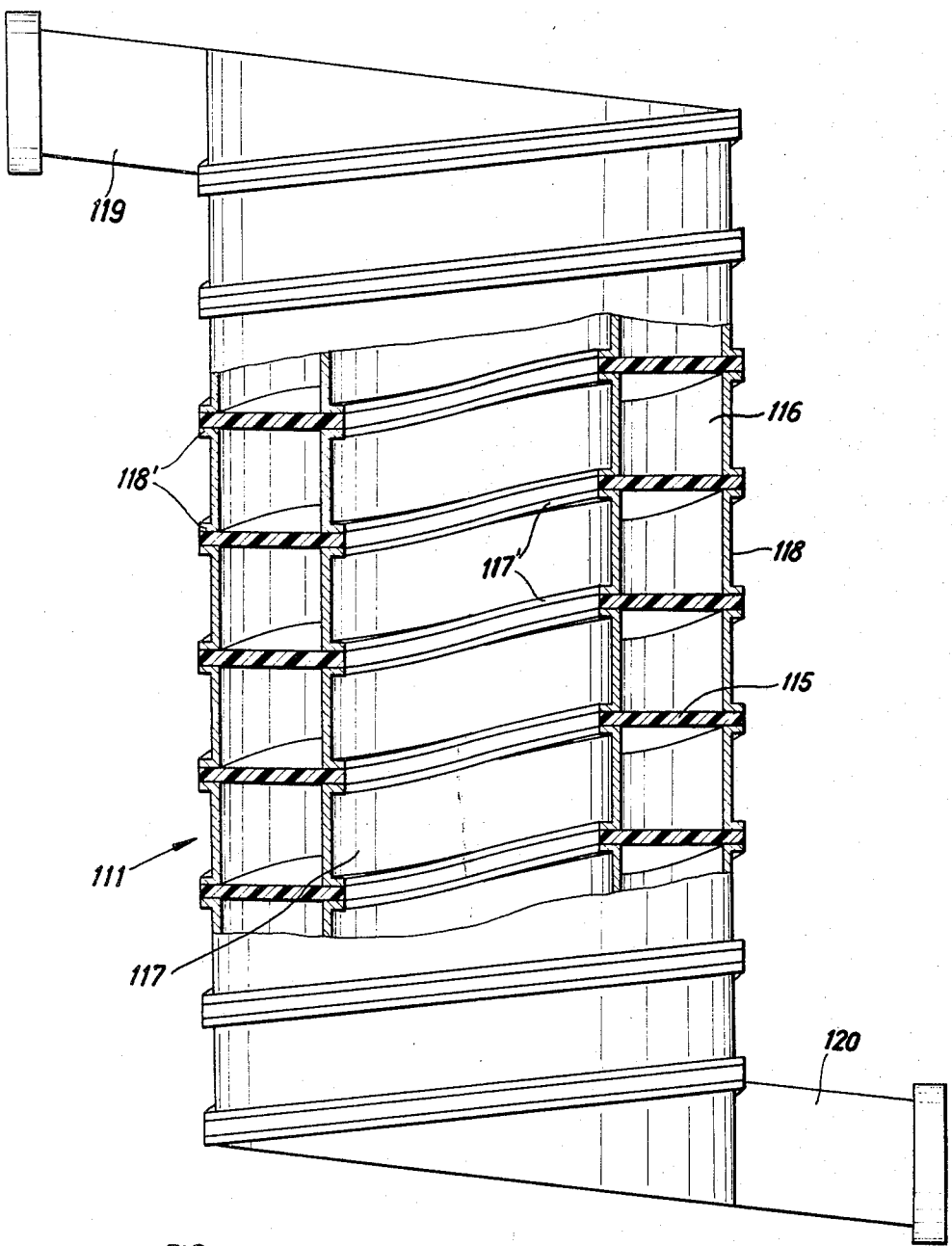
FIG. 3 is a view similar to FIG. 1, showing part of a modified converter according to the invention.

In FIG. 3 we have shown a modified channel structure 111 composed of a helically wound inner metal strip 117, a helically wound outer metal strip 118 coaxially registering therewith, and a helically wound insulating strip 115 whose rectangular profile is perpendicular to that of strips 117 and 118 which are provided with respective end flanges 117' and 118' receiving the strip 115 between them. The result of this construction is again a helical channel 116 of rectangular cross-section having conductive inner and outer walls 117 and 118 to serve as output electrodes and further having transverse nonconductive walls 115 insulating these electrodes from each other. As in the embodiment of FIGS. 1 and 2, an ionized gas heated to high temperatures is admitted at an inlet 119 and discharged at an outlet 120. Furthermore, again as in the preceding embodiment, a magnetic field coaxial with the helical channel structure is produced by means not shown in FIG. 3, preferably one or more coils uniaxially disposed around the structure and rendered superconductive by suitable cooling means.

The operation of the system of FIG. 3 is substantially identical with that of FIGS. 1 and 2. If desired, the strips 115, 116 and 118 can be longitudinally subdivided into juxtaposed sections (conductively interconnected in the case of each electrode 117 and 118) whereby the structure can be extended at will by the inclusion of additional sections.

We claim:

1. A magnetohydrodynamic energy converter comprising a source of constant magnetic flux; guide means forming a substantially helical channel with an axis substantially parallel to the direction of said flux and curving in the direction of deflection of positive ions by said flux, said guide means including inner conductor means and outer conductor means defining lateral walls of said channel; inlet means for admitting a hot ionized metal vapor to an entrance end of said channel; and a load circuit connected across said inner and outer conductor means.

2. A magnetohydrodynamic energy converter comprising uniaxial electromagnetic coil means provided with electric energizing means for producing a constant magnetic flux; guide means forming a substantially helical channel centered on the axis of said flux and curving in the direction of deflection of positive ions by said flux, said guide means including inner conductor means and outer conductor means defining lateral walls of said channel; inlet means for admitting a hot ionized metal vapor with a temperature on the order of 3000° C. to an entrance end of said channel; and a load circuit connected across said inner and outer conductor means.

3. A converter as defined in claim 2 wherein said energizing means includes cooling means for maintaining said coil means in a superconductive state.

4. A converter as defined in claim 2 wherein said inner and outer conductor means extend along two imaginary coaxial cylinder surfaces.

5. A magnetohydrodynamic energy converter comprising a source of magnetic flux; guide means forming a substantially helical channel of substantially rectangular cross-section with an axis substantially parallel to the direction of said flux, said guide means including a helically wound first conductor and a helically wound second conductor defining lateral walls of said channel, said guide means further including dielectric strip means defining transverse walls of said channel; inlet means for admitting a hot ionized gas to an entrance end of said channel; and a load circuit connected across said first and second conductors.

6. A magnetohydrodynamic energy converter comprising uniaxial electromagnetic coil means provided with electric energizing means for producing a magnetic flux; guide means forming a substantially helical channel of substantially rectangular cross-section centered on the axis of said flux, said guide means including a helically wound first conductor and a helically wound second conductor defining lateral walls of said channel, said guide means further including dielectric strip means defining transverse walls of said channel; inlet means for admitting a hot ionized gas to an entrance end of said channel; and a load circuit connected across said first and second conductors.

7. A magnetohydrodynamic energy converter comprising uniaxial electromagnetic coil means provided with electric energizing means for producing a constant magnetic flux; guide means forming a substantially helical channel of substantially rectangular cross-section centered on the axis of said flux and curving in the direction of deflection of positive ions by said flux, said guide means including a helically wound inner conductor and a helically wound outer conductor defining lateral walls of said channel, said guide means further including dielectric strip means defining transverse walls of said channel; inlet means for admitting a hot ionized metal vapor with a temperature on the order of 3000° C. to an entrance end of said channel; and a load circuit connected across said inner and outer conductors.

References Cited

UNITED STATES PATENTS

| 2,715,686 | 8/1955 | Asti | 310—11 |
| 3,034,002 | 5/1962 | Carlson | 310—11 |
| 3,179,824 | 4/1965 | Stuetzer | 310—11 |
| 3,110,843 | 11/1963 | Donaldson | 315—111 |
| 3,239,697 | 3/1966 | Stekly | 310—11 |

DAVID X. SLINEY, *Primary Examiner.*